United States Patent [19]
Summers

[11] Patent Number: 5,838,976
[45] Date of Patent: Nov. 17, 1998

[54] SYSTEM AND METHOD FOR PROFILING CODE ON SYMMETRIC MULTIPROCESSOR ARCHITECTURES

[75] Inventor: Chuck Summers, Plano, Tex.

[73] Assignee: Hewlett-Packard Co., Palo Alto, Calif.

[21] Appl. No.: 563,334

[22] Filed: Nov. 28, 1995

[51] Int. Cl.[6] ................................................. G06F 9/45
[52] U.S. Cl. ........................................................ 395/704
[58] Field of Search .................................. 395/704, 705, 395/706, 683

[56] References Cited

U.S. PATENT DOCUMENTS

| | | | |
|---|---|---|---|
| 5,265,249 | 11/1993 | Kumamoto | 395/650 |
| 5,355,487 | 10/1994 | Keller et al. | 395/704 |
| 5,404,529 | 4/1995 | Chernikoff et al. | 395/683 |
| 5,465,258 | 11/1995 | Adams | 395/704 |

FOREIGN PATENT DOCUMENTS 90311178.9  10/1990  European Pat. Off. .

OTHER PUBLICATIONS

International Search Report, App. No. EP 96 30 8586, Mar. 6, 1997.

"Experience with a Performance Analyzer for Multithreaded Applications," Gilbert J. Hansen, Charles A. Linthicum, Gary Brooks, Convex Computer Corporation, IEEE Supercomputing '90 Proceedings, pp. 124–131.

"Mtool: An Integrated System for Performance Debugging Shared Memory Multiprocessor Applications," Aaron J. Goldberg and John L. Hennessy, IEEE, vol. 4, No. 1, Jan. 1993, pp.28–40.

*Primary Examiner*—Emanuel Todd Voeltz
*Assistant Examiner*—Peter J. Corcoran, III

[57] ABSTRACT

A profiler that accurately measures performance metrics for all threads executing a process on a SMP computer system. The profiler uses dynamic instrumentation to cause threads to sample performance metrics before and after certain code regions. In addition, the profiler uses extensions to a parallel support layer to register a parent thread with its child threads. Each thread stores the measured performance metric, or delta, in a memory cell or cells corresponding to its region and its parent region. When the process is complete, the profiler scans through the memory storage areas and sums the deltas for each particular level of code. Then, the results may be analyzed at the thread or process level. In this manner, the profiler can be adapted to work with any process executing on the computer system.

37 Claims, 5 Drawing Sheets

SYSTEM AND METHOD FOR PROFILING CODE ON SYMMETRIC MULTIPROCESSOR ARCHITECTURES

TECHNICAL FIELD OF THE INVENTION

This invention pertains in general to computer programming and more specifically to a code profiler for collecting performance metrics about a process executing on a symmetric multiprocessor computer system.

BACKGROUND OF THE INVENTION

Modern computer systems often have multiple central processing units ("CPUs") that can execute different, or the same, parts of a process simultaneously. Such computers are called symmetric multiprocessor ("SMP") systems. A single process executing on such a computer can have multiple threads of control simultaneously executing on different CPUs.

When designing for or porting software to SMP systems, it is advantageous to optimize the code such that it can take full advantage of the system. For example, a programmer wants to optimize the code such that process computations are balanced among the threads. Similarly, a programmer seeks to maximize the number of CPUs that actively work during particular code regions.

To achieve these ends, a programmer uses a code "profiler" to analyze the behavior of a process and remove performance bottlenecks. Such profilers typically work by determining the number of CPUs and CPU time used by a process, along with other performance information, for particular code regions. The programmer then uses the profiler's results to revise the process' structure and operation.

For example, a programmer can use a profiler to compare the CPU time with the real-world, or wall-clock, time used to execute a process. Ideally, the concurrency ratio, the ratio of CPU time to wall-clock time, is equal to the number of CPUs available to the process. If the ratio is less than the number of CPUs, then system overhead or performance bottlenecks are slowing the process and its threads.

Some prior art profilers, however, do not provide programmers with insight into the behavior of the process on a thread-by-thread basis. For example, an extremely naive approach of determining CPU usage followed by some profilers is to use a CPU's on board timer to sample the time before and after a code region. This approach determines the amount of time the process spent on that code region. This approach, however, fails to account for the amount of work performed by threads symmetrically executing on different CPUs. That is, the profiler will report that amount of wall-clock time spent on the task, but not the CPU time used by threads executing on other processors. Therefore, the information returned by the naive approach does not enable a programmer to determine which parts of a process are truly occupying the majority of the computer system's time.

Some modern profilers attempt to measure process performance on a thread-by-thread basis. However, such profilers possess different problems. Some profilers require large amounts of data space to hold performance information for each concurrent thread. Others require extreme synchronization to ensure that they produce accurate results. Still other profilers simply do not scale well to systems with many processors. These types of profilers are discussed in more detail in connection with the detailed description of the preferred embodiment.

Therefore, there is a need in the art for a profiler that provides a programmer with a complete analysis of CPU time and other performance metrics of a multithreaded process executing on a SMP computer system. More specifically, there is a need for a profiler that accurately determines performance metrics at the process and thread levels during a single run of the profiled process.

SUMMARY OF THE INVENTION

The above and other needs are met by a profiler hat accurately measures performance metrics for all threads executing a process on a SMP computer system. The profiler uses dynamic instrumentation to cause threads to sample performance metrics before and after certain code regions. In addition, the profiler uses extensions to a parallel support layer to register a parent thread with its child threads. Each thread stores the measured performance metric, or delta, in a memory cell or cells corresponding to its region and its parent region. When the process is complete, the profiler scans through the memory storage areas and sums the deltas for each particular level of code. Then, the results may be analyzed at the thread or process level. In this manner, the profiler can be adapted to work with any process executing on the computer system.

A technical advantage of the present invention is a way to profile code on symmetric multiprocessor computer systems that accounts for all performance metrics within a code region on a thread-by-thread level.

Another technical advantage of the present invention is a way to profile code that yields concurrency ratios from 0 to 'n' threads.

Yet another technical advantage of the present invention is that it provides a summation of performance metrics for the entire process after a single run of the process.

Yet another technical advantage of the present invention is a way to profile code that minimizes synchronization and data exchange amongst threads.

Yet another technical advantage of the present invention is a way to profile code that works with read-only timers/counters that are maintained or accessed on a thread basis and does not require synchronization amongst threads.

Yet another technical advantage of the present invention is a way to profile code that scales well with an increasing number of threads and processors.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention profiles a process executing on a computer system. A "process" is a program, or part of a program, that executes a particular sequence of instructions. Thus, a process is often equivalent to an application or other common type of program.

A process may be comprised of a plurality of threads. Threads are activities that cooperatively carry out a process to its end. In other words, a thread is an execution piece that works in cooperation with other threads to solve the problem on which the process is working.

This application often refers to code "regions." A region is merely a section of code, such as a routine or loop. A code region can be nested within another region. In this case, the encompassing region is the "parent" and the nested region is the "child."

A thread can execute a code region either symmetrically or asymmetrically. Symmetric execution occurs when multiple threads execute the same code region simultaneously on either shared or non-shared data. Symmetric threads are formed when a parent thread splits into, or spawns, several child threads when it reaches a certain code region. The execution while in the code region is called "symmetric parallelism." After the code region is executed, the threads join back together. Asymmetric execution, in contrast, is characterized by threads independently executing different code regions on shared or non-shared data.

Moreover, threads can execute a parallel region in "direct" or "indirect" parallelism. Direct parallelism occurs when the child thread executing the parallel region is actually the same thread as the parent. Indirect parallelism occurs when the child thread executing the parallel region is working on behalf of the parent.

In addition, this discussion occasionally refers to threads as operating at a certain "level," e.g. the parent level. The level of a thread corresponds to how deeply the control flow construct being executed by the thread, like a routine or loop, is nested within other constructs. For example, a parent thread executing a routine can spawn child threads to execute a loop within the routine. In this example, the child threads are working at both the loop and routine levels, while the parent thread is working at the routine level.

The inventive profiler allows a programmer to visualize the performance metrics of a process and its threads as they execute the various levels of the process. Performance metrics include information such as CPU and wall clock time used, data and instruction cache misses, and instruction counts. By repeated application of the outlined principles, the inventive profiler makes each of these metrics available to the programmer at each level of the process.

The remainder of this discussion, however, focuses primarily on CPU and wall clock time. Wall clock time is real-world time. CPU time, in contrast, is the amount of time a process or thread requires to execute. For example, a process having four threads may execute in 10 seconds of wall clock time, but actually require 40 seconds (10 seconds per thread) of CPU time. The ratio of CPU time to wall clock time is called the "concurrency ratio." The concurrency ratio can have a value from 0 to 'n' threads.

By using the present invention, a programmer or other observer can determine exactly how much CPU time was used by each thread or the sum of all threads executing at any level of a process. The best way to explain the operation of the present invention is to contrast it with the prior art.

Figure 2:
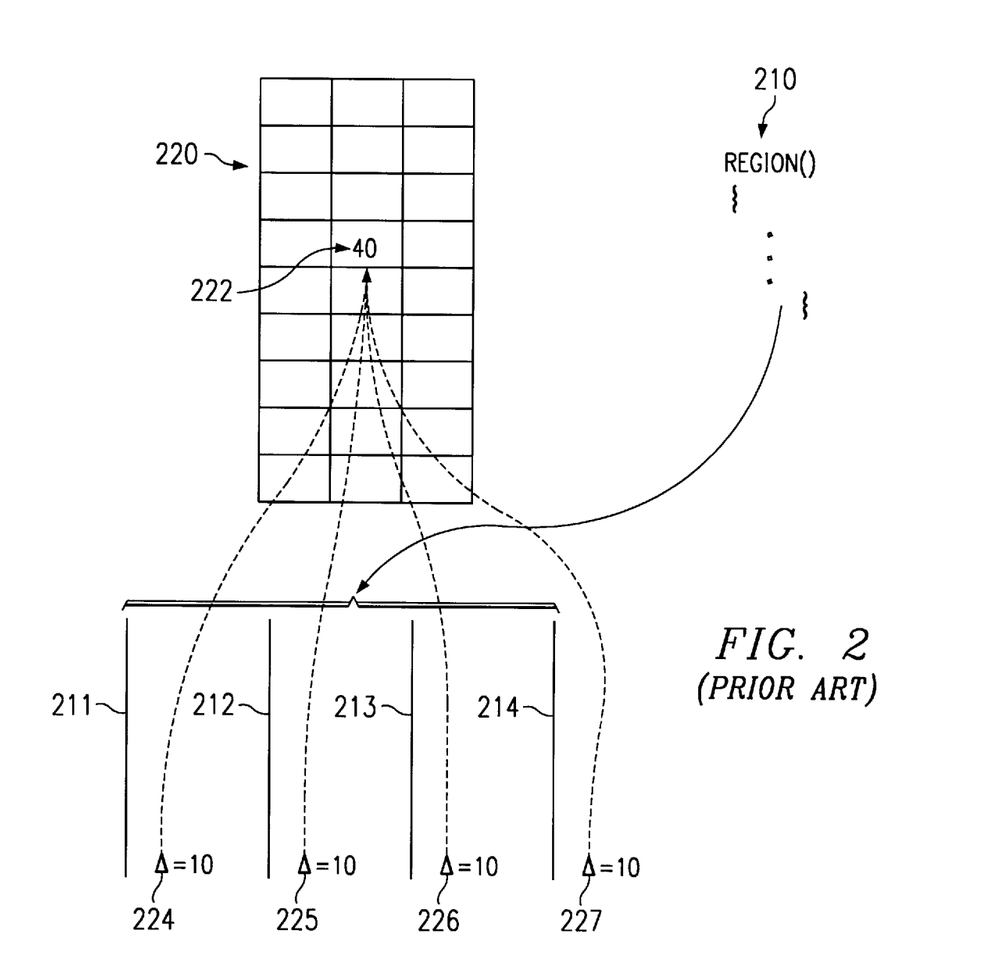
FIG. 2 illustrates a prior art profiler.

FIG. 2 shows a prior art code profiler that attempts to improve upon the naive scheme discussed in the Background section by accounting for different threads. FIG. 2 includes a code region 210, four threads 211–214, and a memory storage area 220 having a data cell 222. While only four threads 211–214 are shown in FIG. 2 and the other figures, it is important to recognize that a process can have any number of threads.

Together, the four threads 211–214 symmetrically execute the region 210. Each thread has a corresponding CPU time delta 224–227. Each delta represents the amount of CPU clock time its corresponding thread 211–214 spent working on the code region 210. A thread typically determines its delta by sampling a CPU timer before and after the code region. The delta is the difference in time between the samples.

The data cell 222 is simply a memory address within the memory storage area 220 capable of holding a delta value. Each thread 211–214 can access the value in cell 222. However, a thread must obtain exclusive access to cell 222 before the thread can change the value contained therein. To obtain exclusive access, a thread must lock cell 222. The locking process is called "synchronization." When a thread is finished updating cell 222, the thread releases the lock.

In operation, the profiler of FIG. 2 directs each thread 211–214 to sample its CPU clock before and after the thread executes the code region. Then, each thread adds the time difference of the samples, or delta, to the value in cell 222. When all of the threads are finished, cell 222 contains the total CPU time used required to execute region 210.

For example, assume that each thread in FIG. 2 has a delta of 10 CPU seconds. Upon completion, the total CPU time contained in cell 222 is 40 seconds. Thus, cell 222 contains the total amount of CPU time used by all of the threads in executing the measured code region.

The advantage of the approach of FIG. 2 is that very little memory space is required to store the thread timings because all threads use the same cell 222. However, a corresponding disadvantage is that cell 222 must be in shared coherent memory.

The major disadvantage of the FIG. 2 profiler is that it does not scale well. This disadvantage is due to the extreme amount of synchronization required amongst the threads. Specifically, each thread may be required to wait a significant amount of time before gaining exclusive access to cell 222, thereby slowing down the process and the profiler. If the profiler is executing on a system with a large number of CPUs or threads, the synchronization delays make profiling by this method prohibitive. Non-linear increases in wall clock time for a multithreaded process can be expected for a profiler using this method.

Figure 3:
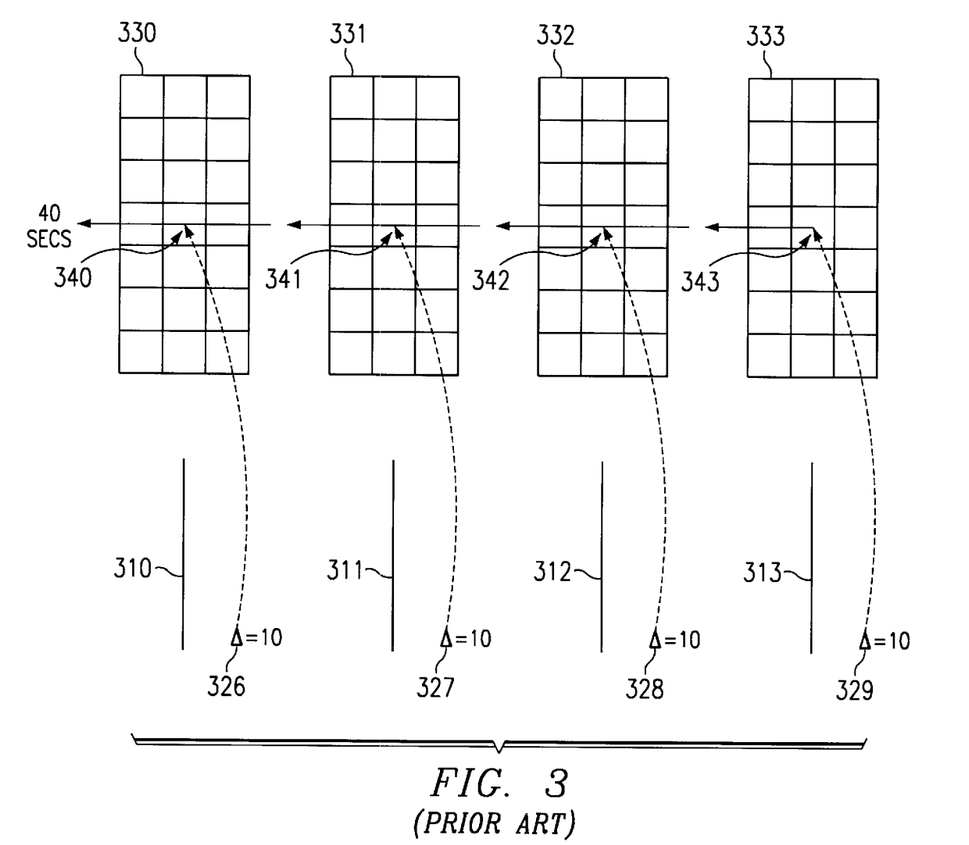
FIG. 3 illustrates a prior art profiler.

FIG. 3 discloses another prior art profiler that resolves the scaling difficulties of FIG. 2's profiler. FIG. 3 shows four threads 310–313 and four corresponding memory storage areas 330–333. Each thread 310–313 has a delta 326–329 and each memory storage area has a storage cell 340–343.

In the profiler of FIG. 3, each thread stores its delta in a different storage cell. A programmer (or other observer) can use the profiler to either sum the cells 340–343 to obtain the total CPU time used by the code region or can consider each thread's delta (CPU time) individually. If each delta 326–329 is 10, for example, then each storage cell 340–343 will also contain 10 and the total CPU time used to execute the region is 40 seconds.

The profiler of FIG. 3 does not require shared coherent memory (as does the profiler of FIG. 2) and does not suffer from the synchronization and scalability problems as discussed above with respect to FIG. 2. This profiler, however, requires one memory storage area per thread to store the deltas.

Figure 4:
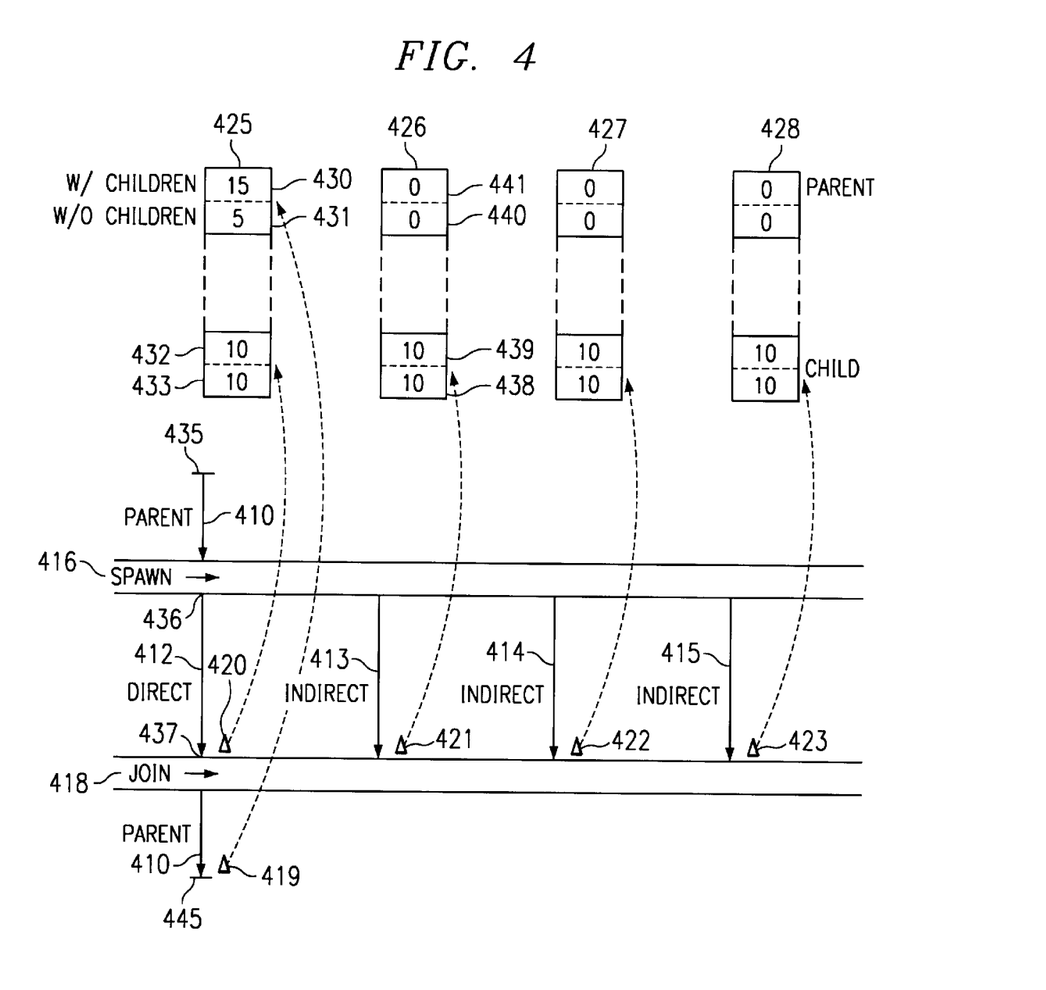
FIG. 4 illustrates the problems inherent in the profiler of FIG. 3.

In addition, the profiler of FIG. 3 does not capture time across a region that contains a parallel subregion. FIG. 4 demonstrates this disadvantage. In addition, FIG. 4 shows considerably more detail than the previous figures as this detail is also necessary to understand the present invention.

FIG. 4 shows a parent thread 410 that spawns four child threads 412–415 at spawn point 416. Note that child thread 412 is parent thread 410 executing in direct parallelism. At join point 418, the child threads 412–415 finish executing and join back into parent thread 410. Each thread 410, 412–415 has an associated delta 419–423. Note that delta 419 corresponds to parent thread 410 while delta 420 corresponds to child thread 412.

Each thread 410, 412–415 has an associated memory storage area 425–428. Each memory storage area, such as storage area 425, has at least two memory cells for each measured region in the process. In FIG. 4, only four cells are shown in each thread's storage area. Two of the cells, for example cells 430 and 431, are associated with the parent (caller) region while two of the cells 432,433 are associated with the child (callee) region. In each set of two cells, one cell 430,432, holds a thread's delta "with children," that is, including the deltas of any child regions measured and executed. The other cell 431,433 holds a thread's delta "without children," that is, not including the deltas of threads executing child regions.

Assume that parent thread 410 requires 5 seconds of serial CPU time to execute. Also assume that child threads 412–415 each require 10 seconds of CPU time to execute the parallel region. At point 435, parent thread 410 takes a starting sample from its CPU timer. At spawn point 416, parent thread 410 spawns child threads 412–415. At point 436, the child threads 412–415 each sample their respective CPU timers. At point 437, the child threads 412–415 finish the parallel region, sample their CPU timers, and compute their respective deltas 420–423.

Then, each child thread 412–415 stores its delta in the appropriate cells. Thus, thread 412 stores its delta 420, 10 seconds, in cells 432 and 433 (these cells have the same value since thread 412 did not execute any child regions). The other child threads 413–415 store their deltas 421–423 in the cells corresponding to themselves, but not in the cells corresponding to their parent region, since the child threads 413–415 do not know which parent thread spawned them. For example, thread 413 stores its delta 421 in cells 438 and 439. However, thread 413 has no way of knowing which thread spawned it and, therefore, cannot store its delta in the cells 440,441 corresponding to its parent region.

Finally, at point 445, the parent thread 410 finishes its execution and again samples its CPU's timer. Then, thread 410 stores its delta 419, 15 seconds, in cell 430. The parent thread also stores its CPU time without children, 5 seconds, in cell 431.

When the process has finished execution, the profiler of FIG. 4 sums up the delta values for each thread and code region. In this example, the profiler will measure the correct amount, 40 seconds, of CPU time used by the child threads to execute the parallel region. However, the profiler will incorrectly measure 15 seconds, instead of 45 seconds, of CPU time used by the parent region 410 to execute the code region including the parallel threads. The CPU time for the parent region is missing 30 seconds because the child regions were unable to determine to which parent region they should have attributed their CPU time.

Therefore, the FIG. 4 profiler will only report the CPU time used by the parent thread 410. Accordingly, the concurrency ratio (CPU time/wall-clock time) at the level of thread 410 is never greater than one. This is a major disadvantage when trying to use the profiled data to observe the true parallel behavior of the system.

Figure 1:
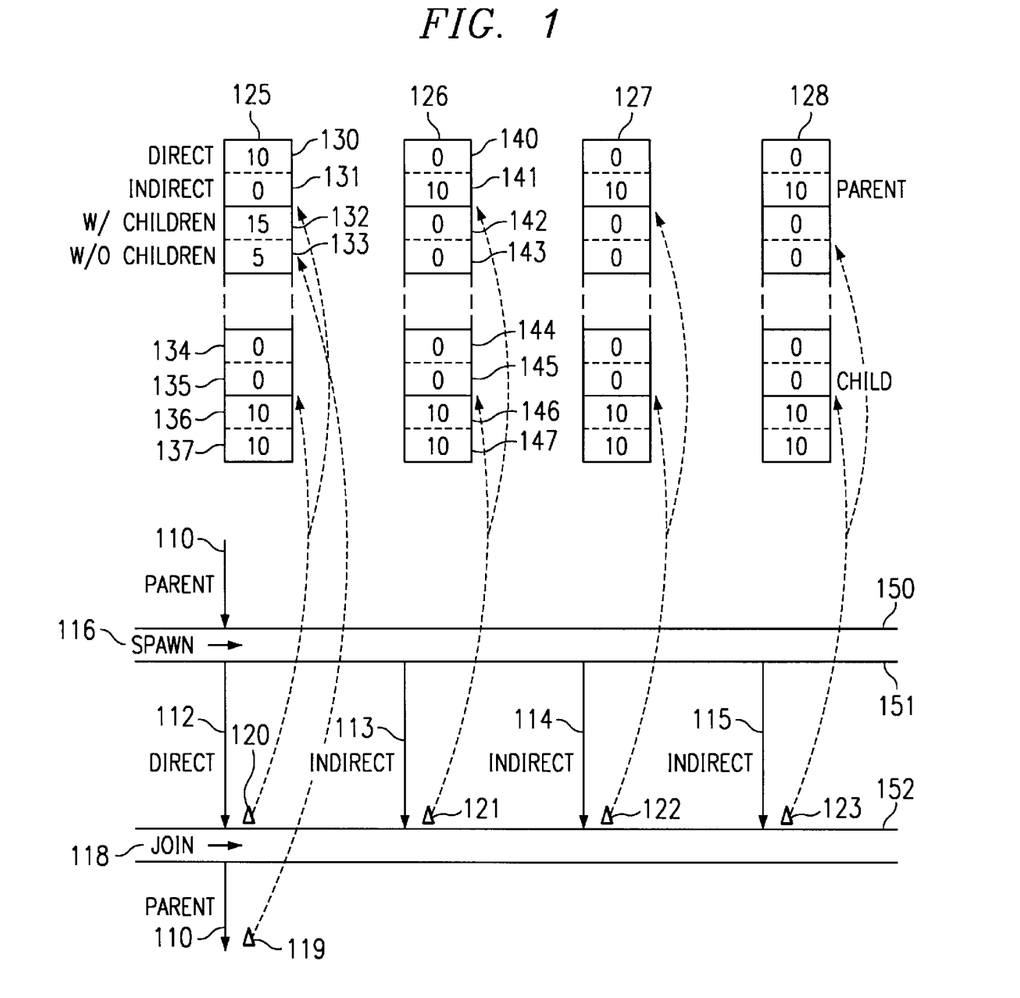
FIG. 1 illustrates a preferred embodiment of a profiler according to the present invention.

The inventive profiler, as shown in FIG. 1, combines the FIG. 4 profiler with a technique that causes threads to callback registered functions when reaching certain points of execution. In this manner, child regions can determine their parent regions. In the below discussion, reference is made to a parallel support layer (PSL). The PSL is a means for allocating parallel threads in a computer system. The operation of the PSL is fully described in the discussion of FIGS. 5–6.

There are four distinct points of execution reached by a process, or thread, when working with a PSL and using symmetric parallel threads. The first point is "before spawn," which occurs just before the requesting process or thread asks for additional threads to help execute a particular code region. The next point is "after spawn," which occurs just after the threads have been allocated but before the threads have begun to execute. Another point is "before join", which occurs just before the threads complete their execution. Finally, the threads reach "after join," which is when the additional threads have completed their execution and only the requesting process or thread remains.

Asymmetric parallel regions have only two distinct points: "create" and "exit." Create occurs just after a thread has been created. Exit occurs when the created thread completes its execution.

FIG. 1 shows the operation of the inventive profiler. FIG. 1 shows a parent thread 110 that pawns four child threads 112–115 at spawn point 116. Note that child thread 112 is parent thread 110 executing in direct parallelism. At join point 118, the child threads 112–115 finish executing and join back into parent thread 110. Each thread 110, 112–115 has an associated delta 119–123. Note that delta 119 corresponds to parent thread 110 while delta 120 corresponds to child thread 120.

Each thread 110, 112–115 has an associated memory storage area 125–128. The memory storage areas, such as storage areas 125 and 126, have at least four cells for each measured region in the process, although only eight cells are shown in FIG. 1. For example, memory storage area 126 contains four cells 140–143 associated, with the parent region and four cells 144–147 associated with the child region. Cells 140 and 141 store the CPU time spent by thread 113 executing in direct and indirect parallelism, respectively, on behalf of parent thread 110. Cells 142 and 143 store the CPU time with and without children, respectively, spent by thread 113 executing on behalf of parent thread 110 (as described with respect to FIG. 4). Likewise, cells 144–147 hold the same information as cells 140–143, except that cells 144–147 are associated with thread 113.

When the parent thread 110 reaches the before spawn point 150, the PSL allocates child threads 112–115. The parent thread 110 also registers itself with the PSL 618 so that the child threads 112–115 know which parent thread 110 spawned them. Next, at the after spawn point 151, each of the child threads 112–115 samples its CPU timer based on a PSL triggered callback (this is the start value).

Once the parallel child threads 112–115 reach the before join point 152, they each again sample their CPU timers (this is the end value) and compute a delta. Then, each child thread 112–115 stores its delta 120–123 in the proper memory cells, as described below.

Assume that parent thread 110 requires 5 seconds of CPU time to execute the serial region, and each child thread 112–115 requires 10 seconds to execute the parallel region. Thus, thread 112 stores its delta 120, 10 seconds, in cell 130 (since it was executing in direct parallelism). Thread 112 also stores its delta 120 in cells 136 and 137 as described with respect to FIG. 4.

Likewise, thread 113 stores its delta 121 in cell 141 since it was executing in indirect parallelism. Thread 113 stores its delta in cells 146 and 147 as described with respect to FIG. 4.

When parent thread 110 completes its execution, it again samples its CPU timer and calculates its delta 419. Then, parent thread 110 stores its delta with children (15 seconds) in cell 132 and its delta without children (5 seconds) in cell 133 as described with respect to FIG. 4.

Once execution of the process is complete, the profiler scans through the memory cells and retrieves the timing values for the various code regions. For each region, the profiler can determine a thread's inclusive timing, the sum of with children deltas plus the sum of the indirect parallelism deltas, and the thread's exclusive timing, the thread's inclusive time minus the inclusive time of all the thread's children. For example, the inclusive timing for thread 110 is 45 seconds (15+(3*10)). The exclusive timing is 5 seconds (45−40).

A preferred embodiment of the profiler is the Convex Performance Analyzer, Convex Part No. 710-018415-009, available from Convex Computer Corporation, 3000 Waterview Parkway, Richardson, Tex. 75080.

Figure 5:
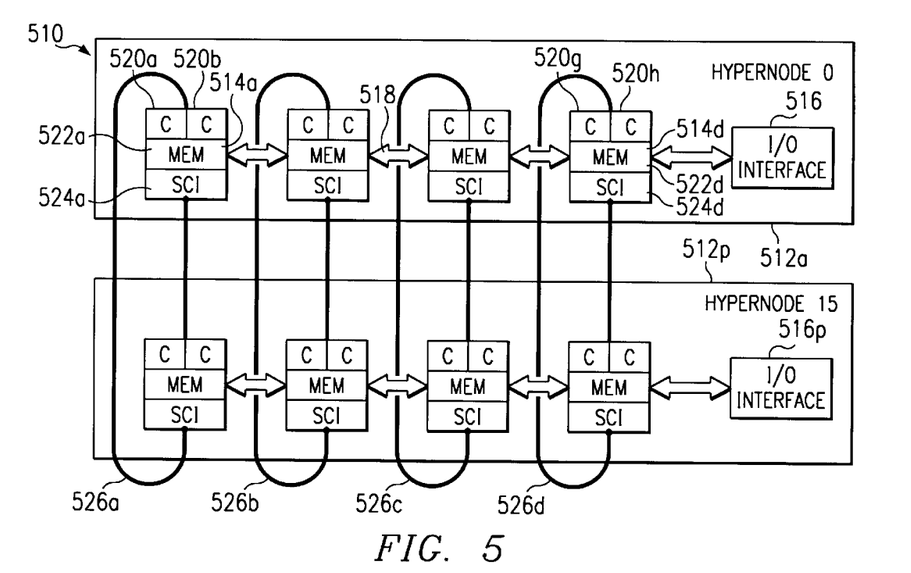
FIG. 5 illustrates a block diagram of a symmetric multi-processor computer system.

The inventive profiler preferably executes on a SMP computer system, but could also be adapted to execute on a multiple instruction multiple data ("MIMD"), sometimes referred to as "massively parallel," computer system. FIG. 5 is a functional block diagram of a preferred hardware embodiment for executing the inventive profiler. FIG. 5 shows a symmetric multiprocessor ("SMP") computer system 510. For a more complete description of computer system 510, reference is made to "Exemplar Architecture," Convex Part No. 081-023430-000, incorporated by reference herein and available from Convex Computer Corporation, 3000 Waterview Parkway, Richardson, Tex. 75080. Processing system 510 includes a plurality of hypernodes 512*a–p*. In the illustrated embodiment, processing system 510 includes 16 hypernodes 512, although in alternate embodiments the number of hypernodes 512 may vary widely depending on the size and application of processing system 510.

In general, each hypernode 512 includes a plurality of sub-processing blocks 514 and an I/O interface 516 coupled together by internal interconnection circuitry 518. In the illustrated embodiment, each hypernode 512 includes four sub-processing blocks 514*a–d*, although the number of sub-processing blocks 514 may vary depending on the size and application of processing system 510. In the illustrated embodiment, each sub-processing block 514 generally includes a pair of central processing units 520*a–b*, memory 522, and a scalable coherent interface 524. The hypernodes 514 are coupled together using one dimensional interface rings 526*a–d* through the corresponding scalable coherent interfaces 524*a–d*.

Figure 6:
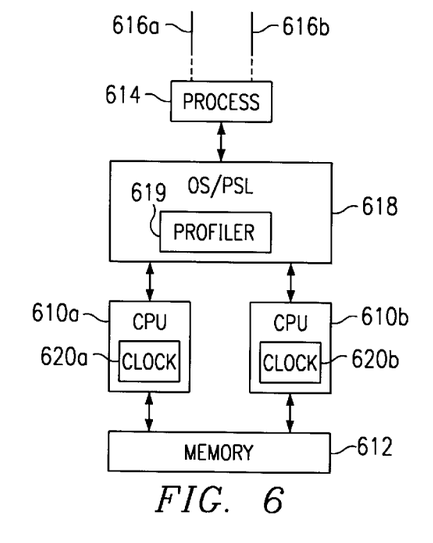
FIG. 6 illustrates a block diagram showing the operative components of the computer of FIG. 5.

FIG. 6 is a block diagram depicting the operative components in the SMP system of FIG. 5. Shown are two processors 610*a–b*, a memory 612, a process 614 having multiple threads 616*a–b*, and the operating system and parallel support layer 618.

Processors 610 can be any well known CPU adapted to work in the above-described SMP system, such as a HP PA-RISC 7200. Each processor has a local read-only clock (also referred to as a timer) 620*a–b* that can be accessed by a thread 616*a–b*. In addition, each processor has additional counters and timers that provide performance metrics including instruction and data cache misses and instruction counts. These timers and counters can be accessed by a process or thread in the same way as can clocks 620*a–b*.

Memory 612 can be any form of addressable memory capable of holding information used by the processors. A high speed random access memory ("RAM") is preferred. However, memory 612 could be a fixed disk drive accessible directly or as part of a virtual memory system. Memory 612 can be divided into multiple memory storage areas comprised of either separate banks of physical memory or logical divisions within a single memory. Memory 612 has a plurality of addressable storage locations which are equivalent to the memory storage areas and memory cells discussed above.

Operating system 618 can be any of a variety of operating systems adapted to execute on the SMP system. A PSL 618 provides support allowing process 614 to have multiple threads of execution. The PSL can be any well known type of PSL, such as "Pthreads," and its exact operation need not be discussed in detail herein. PSL 618 is preferably implemented in software as part of the operating system. However, PSL 618 can also be implemented as a separate layer above the operating system. Alternatively, PSL 618 could reside in hardware.

When a process 614 or thread 616 requires additional threads to execute a certain region, it requests the threads from PSL 618. PSL 618 then sets up and allocates the threads as is well known. In addition, PSL 618 can be extended. That is, extensions an be added to PSL 618 to modify the way that PSL 618 allocates and sets up threads.

The multithreaded process 614 is compiled by a compiler using a technique called "instrumentation" that essentially leaves "slots" in the compiled process 614 that can be dynamically selected and filled in with hooks to data under the control of the inventive profiler. Such compilers include the C and Fortran compilers available from Convex Computer Corporation, 3000 Waterview Parkway, Richardson, Tex. 75080. These compilers leave slots at the beginnings and ends of certain code constructs of interest to the programmer.

The inventive profiler of FIG. 1 uses dynamic instrumentation to revector slots in the program to routines that sample a timer/counter when entering a region and calculate and store a delta in the appropriate memory cells when exiting a region. The present invention also comprises extensions to PSL 618 that cause threads to callback registered functions when reaching certain points of execution. Thus, the inventive profiler combines the FIG. 4 profiler with PSL extensions allowing the child regions to determine their parent regions.

In summation, the inventive profiler uses dynamic instrumentation to instruct the threads to calculate and store their deltas. In addition, the inventive profiler uses extensions to the PSL 618 to register the parent thread 110 with the PSL. In this manner, child. threads 112–115 can identify their parent thread 110 and store their delta values in the appropriate memory cells.

It is important to note that the profiler operation discussed above can be applied repeatedly to all parent-child relationships in a process to accurately analyze the process as a whole. For example, the parent thread 110 discussed above could actually be one of many parallel child threads spawned by another parent thread. In addition, the profiler described above works equally well with symmetric and asymmetric threads. Since each thread stores its delta in cells corresponding to the region it executed and to its calling, or parent, region, the profiler accounts for all CPU time used by the process.

It is also important to note that the model used by the inventive profiler scales very well to systems with few or many processors. Although the present invention and its advantages have been described in detail, it should be understood that various changes, substitutions and alterations can be made herein without departing from the spirit and scope of the invention as defined by the appended claims.

What is claimed is:

1. A method of profiling a process having a plurality of threads executing on a computer system, comprising:
   allocating a memory storage area within the computer system for each thread, each memory storage area having a plurality of memory cells, wherein each memory cell is associated with a particular thread of the plurality of threads;
   registering a parent thread with a plurality of child threads, the parent and plurality of child threads selected from the plurality of threads;
   calculating, by each child thread, a delta for a particular code region of the process; and
   storing, by each child thread, the delta in a first memory cell associated with the child thread and in a second memory cell associated with the registered parent thread.

2. The method of claim 1, wherein the storing step further comprises the step of:
   storing, by each child thread, the delta in a third memory cell corresponding to whether the child thread executed the code region in direct parallelism.

3. The method of claim 1, wherein the storing step further comprises the step of:
   storing, by each child thread, the delta in a fourth memory cell corresponding to whether the delta includes deltas of threads spawned by the child thread.

4. The method of claim 1, wherein the registering step further comprises the steps of:
   registering the parent thread with a parallel support layer of the computer system;
   spawning the plurality of child threads from the parallel support layer.

5. The method of claim 1, wherein the computer system is an SMP computer system.

6. The method of claim 1, wherein the calculating step further comprises the steps of:
   sampling, by each child thread, a performance metric at a beginning of the code region to determine a first value;
   sampling, by each child thread, the performance metric at an end of the code region to determine a second value; and
   calculating, by each child threads, a delta from the first and second values.

7. The method of claim 6, wherein the performance metric is CPU time.

8. The method of claim 6, wherein the performance metric is cache misses.

9. The method of claim 6, wherein the performance metric is cache hits.

10. The method of claim 6, wherein the performance metric is an instruction count.

11. A profiler for profiling a process having a plurality of threads executing on a computer system having a memory, comprising:
    allocating means for allocating a memory storage area in the memory for each thread, each memory storage area having a plurality of memory cells, wherein each memory cell is associated with a particular thread of the plurality of threads;
    registering means for registering a parent thread with a plurality of child threads, the parent thread and plurality of child threads selected from the plurality of threads;
    calculating means for calculating, for each child thread, a delta for a particular code region of the process; and
    storing means for storing, for each child thread, the delta in a first memory cell associated with the child thread and a second memory cell associated with the registered parent thread.

12. The profiler of claim 11, wherein the registering means comprises:
    a parallel support layer for allocating child threads; and
    extensions to the parallel support layer for registering a parent thread with the allocated child threads.

13. The profiler of claim 11, wherein the computer system is an SMP computer system.

14. The profiler of claim 11, wherein the calculating means further comprises:
    first sampling means for sampling a performance metric for each child thread at a beginning of the code region to determine a first value;
    second sampling means for sampling the performance metric for each child thread at an end of the code region to determine a second value; and
    means for calculating, for each of the child threads, a delta from the first and second values.

15. The profiler of claim 14, wherein the performance metric is CPU time.

16. The profiler of claim 14, wherein the performance metric is cache misses.

17. The profiler of claim 14, wherein the performance metric is cache hits.

18. The profiler of claim 14, wherein the performance metric is an instruction count.

19. The profiler of claim 11, wherein the storing means further comprises:
    means for storing, for each child thread, the delta in a third memory cell corresponding to whether the child thread executed the code region in direct parallelism.

20. The profiler of claim 11, wherein the storing means further comprises:
    means for storing, for each child thread, the delta in a fourth memory cell corresponding to whether the delta includes deltas of threads spawned by the child thread.

21. A profiler for profiling the execution of a process having a plurality of threads on a computer system having a memory and a plurality of CPUs, comprising:

means for allocating memory storage areas within the memory for each of the plurality of threads, each memory storage area having a plurality of memory cells, wherein each memory cell is associated with a particular thread of the plurality of threads;

a parallel support layer for spawning a plurality of child threads on behalf of a parent thread and for registering the parent thread with the child threads, wherein the parent and child threads are a subset of the plurality of threads and each child thread is associated with a different CPU;

sampling means for sampling the CPU associated with each child thread to determine a performance metric for each child thread; and     storing means for storing the performance metric for each child thread in the storage area corresponding to that child thread in a first memory cell associated with the child thread and a second memory cell associated with registered parent thread.

22. The profiler of claim 21, wherein the performance metric is CPU time.

23. The profiler of claim 21, wherein the performance metric is cache misses.

24. The profiler of claim 21, wherein the performance metric is cache hits.

25. The profiler of claim 21, wherein the performance metric is an instruction count.

26. The profiler of claim 21, wherein the storing means further comprises:

means for storing, for each child thread, the performance in a third memory cell corresponding to whether the child thread executed the code region in direct parallelism.

27. The profiler of claim 21, wherein the storing means further comprises:

means for storing, for each child thread, the delta in a fourth memory cell corresponding to whether the delta includes deltas of threads spawned by the child thread.

28. A computer program product having a computer readable medium having computer program logic recorded thereon for profiling a process having a plurality of threads executing on a computer system having a memory, said computer program product comprising:

allocating means for allocating a memory storage area in the memory for each thread, each memory storage area having a plurality of memory cells, wherein each memory cell is associated with a particular thread of the plurality of threads;

registering means for registering a parent thread with a plurality of child threads, the parent thread and plurality of child threads selected from the plurality of threads;

calculating means for calculating, for each child thread, a delta for a particular code region of the process; and     storing means for storing, for each child thread, the delta in a first memory cell associated with the child thread and a second memory cell associated with the registered parent thread.

29. The computer program product of claim 28, wherein the registering means comprises:

a parallel support layer for allocating child threads; and     extensions to the parallel support layer for registering a parent thread with the allocated child threads.

30. The computer program product of claim 28, wherein the computer system is an SMP computer system.

31. The computer program product of claim 28, wherein the calculating means further comprises:

first sampling means for sampling a performance metric for each child thread at a beginning of the code region to determine a first value;

second sampling means for sampling the performance metric for each child thread at an end of the code region to determine a second value; and     means for calculating, for each of the child threads, a delta from the first and second values.

32. The computer program product of claim 31, wherein the performance metric is CPU time.

33. The computer program product of claim 31, wherein the performance metric is cache misses.

34. The computer program product of claim 31, wherein the performance metric is cache hits.

35. The computer program product of claim 31, wherein the performance metric is an instruction count.

36. The computer program product of claim 28, wherein the storing means further comprises:

means for storing, for each child thread, the delta in a third memory cell corresponding to whether the child thread executed the code region in direct parallelism.

37. The computer program product of claim 28, wherein the storing means further comprises:

means for storing, for each child thread, the delta in a fourth memory cell corresponding to whether the delta includes deltas of threads spawned by the child thread.

\* \* \* \* \*